G. HENRY.
FREE WHEEL DRIVE FOR CYCLES.
APPLICATION FILED NOV. 28, 1917.
1,278,648.
Patented Sept. 10, 1918.
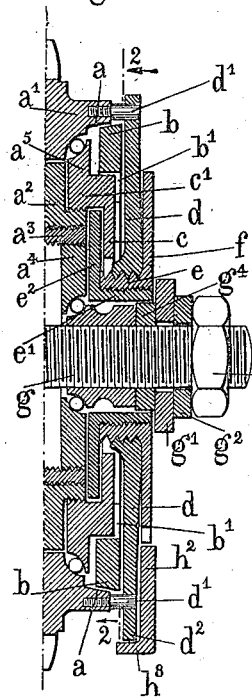
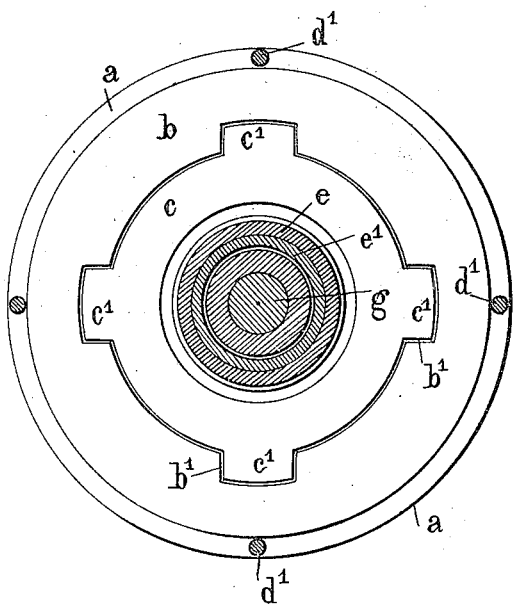
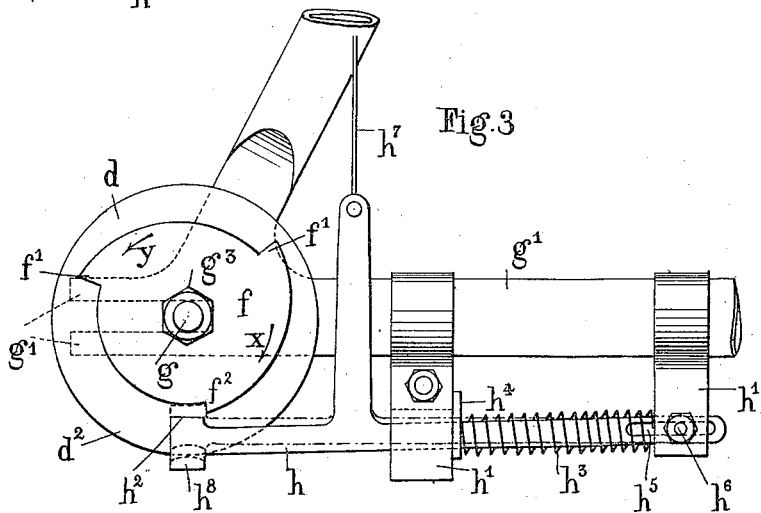
INVENTOR
GASTON HENRY
BY
ATTORNEYS

UNITED STATES PATENT OFFICE.

GASTON HENRY, OF PARIS, FRANCE.

FREE-WHEEL DRIVE FOR CYCLES.

1,278,648. Specification of Letters Patent. Patented Sept. 10, 1918.

Application filed November 28, 1917. Serial No. 204,431.

*To all whom it may concern:*

Be it known that I, GASTON HENRY, a citizen of the Republic of France, and a resident of 159$^{bis}$ Boulevard Montparnasse, Paris, France, have invented new and useful Improvements in or Relating to Free-Wheel Drives for Cycles, of which the following is a specification.

The present invention relates to an arrangement applicable to bicycles and enabling a coaster or free-wheel drive to be changed, when desired, into a fixed wheel drive and vice versa, without dismounting from the machine and by pedaling in one direction or in the other.

This arrangement consists of a male cone fast to the fixed portion of the free-wheel pinion, and of a female cone, fast to the loose part of this free-wheel pinion, the male cone being capable of being engaged in the female cone or of being disengaged from the latter according as it is wished to employ fixed-wheel drive or free-wheel drive.

In accordance with the invention, a plate sharing in the movement of rotation of the loose portion of the free-wheel pinion, can, by screwing itself or unscrewing itself upon a threaded socket, progressively cause the male cone to approach to or separate from the female cone, in such a way as to clutch or declutch these two cones, the said screw-threaded socket, normally loose, being capable of being momentarily held stationary so as to permit the screwing of the plate in one direction or in the other, according as the rider pedals forward or back-pedals.

This socket is immobilized, at the desired moment, by a rod which engages with one of the claws or ratchet teeth of a disk fast to this socket, when the cyclist back-pedals, in such a way as to pass from free-wheel drive to fixed-wheel drive, while in order to obtain the opposite result, the cyclist pedals forward and, by acting upon a hand-control device, situated within reach of his hand, brings this rod into engagement with another claw or ratchet tooth of the disk, nearer than the others to the axis of rotation of this disk.

In the annexed drawings, Figure 1 is a view in vertical section through the axis of the clutch device. Fig. 2 is a vertical section on line 2—2 of Fig. 1. Fig. 3 is a side elevation, on a different scale, of the device for immobilizing the threaded socket.

The female cone is shown at $a$ and is integral with the loose portion or ring $a^1$ of the free-wheel pinion; the male cone $b$, arranged interiorly of the first and made fast with the fixed part $a^2$ of the free-wheel pinion (screwed upon a cup or sleeve $a^3$ in its turn screwed upon the hub $a^4$) by means of a crown $c$ which is fast with the ring-mount $a^5$ of the free pinion and engages by means of the projections $c^1$ in notches $b^1$ of corresponding shape in the male cone $b$; the latter thus participates in the movement of rotation of the hub of the wheel.

Upon the female cone $a$ is fixed by means of studs $d^1$, a plate $d$ screwed upon a dowel or socket $e$, screw-threaded exteriorly, which is itself screwed upon a second socket $e^1$ with screw-threads different from those of the first-mentioned socket; the two sockets thus joined together form only one, the plate $d$ and the crown $c$ being held between a disk $e^2$ fast with the socket $e^1$, at the rear, and a disk $f$ fast with the socket $e$ at the front. This socket is maintained in place by one of the arms of the fork $g^1$ of the frame which carries the wheel, by the washer $g^2$ and the nut $g^3$ screwed upon the axle $g$ of the wheel, and by a washer or distance piece $g^4$.

The socket $e$ $e^1$ normally participates in the movement of rotation of the free-wheel pinion, being driven by the plate $d$ which is screwed thereon and is fast with the loose part $a^1$ of the free-wheel pinion; when it is wished to bring the male cone $b$ nearer to or away from the female cone $a$, the plate $d$ has to be screwed up or unscrewed from the socket $e$ $e^1$, the latter having to be held stationary for this purpose, so that this plate $d$ will be able to act upon the male cone $b$ and tighten it, and progressively wedge it into the female cone $a$ or render it progressively free, according to whether the plate is screwed toward the left or toward the right (Fig. 1).

In order to hold the socket $e$ $e^1$ stationary, I may, by way of example, make use of the following arrangement (Fig. 3); upon one of the arms $g^1$ of the frame-fork is supported by straps or hangers $h^1$ $h^1$ a rod $h$ having at its rear end a beak $h^2$ arranged in the vertical plane of rotation of the disk $f$, which latter is fast with the socket $e$; this disk $f$ is furnished with two notches affording spurs or ratchet teeth $f^1$ and a third notch with tooth $f^2$, the latter being nearer to the axis of the disk $f$ than the two others and arranged at a distance from this axis such that when pedaling takes place in the forward direction (arrow $x$), this tooth $f^2$ does not strike the beak $h^2$ of the rod $h$ if the latter is left to its own weight.

The drawing shows the arrangement at the moment when the pinion allows free wheeling to take place; the disk $f$ rotated with the plate $d$ and the loose part $a^1$ of the free-wheel pinion, does not engage or hook, during its rotation, the beak $h^2$ of the rod $h$ by means of its beak $f^2$; the teeth $f^1$ depress a little the beak $h^2$ of the rod $h$, but the latter resumes its normal position (shown in full lines) by sliding in its supporting and guiding straps $h^1$. When the cyclist wishes to lock the pinion in order to have a fixed wheel drive (for instance down a hill, when he wishes to brake through the pedaling gear), it is sufficient to back-pedal; the disk $f$ by its movement of rotation in the direction of the arrow $y$ (Fig. 3), strikes by means of one of the teeth $f$, the beak $h^2$ of the rod $h$ and is thus stopped; in order to avoid a too abrupt stop, I preferably arrange a coil spring $h^3$ around the rod $h$ between the front strap $h^1$ and a shoulder $h^4$ of the rod $h$ so that this latter can, under the shock, move slightly forwardly from rear, being guided by its slot $h^5$ and a pin $h^6$, but returns to its first position under the action of the spring; the shoulder $h^4$ which abuts against the rear strap $h^1$ limits the rearward movement. The disk $f$ and consequently the socket $e$ $e^1$ are thus immobilized while the plate $d$ continues to turn; the cyclist by continuing to back-pedal, screws the plate $d$ upon the socket $e$ from right to left (Fig. 1); this plate brings the male cone $b$ to the female cone $a$ and thus effects a progressive wedging, until the locking action is complete. The pinion thereupon affords a fixed wheel drive and the cyclist can then so use it by pedaling forward in the usual way.

In order to return to free-wheel drive, it is only necessary to lift the rod $h$ slightly (by acting upon a small hand device or grip arranged within reach and controlling this rod $b$ by a cable $h^7$) continuing to pedal forward; the tooth $f^2$ of the disk $f$ turning in the direction of the arrow $x$ then strikes the beak $h^2$ of the rod $h$ (position shown in dotted lines in Fig. 3); the disk $f$ and consequently the socket $e$ $e^1$ are locked; the plate $d$ continuing to turn, is unscrewed from left to right (Fig. 1) upon the socket $e$, thus progressively declutching the two cones $a$ and $b$, so that without jerk or shock, free-wheel drive is resumed. When the plate $d$ is entirely unscrewed, that is to say has returned to the end of its travel toward the right (position shown on the drawing), the cyclist releases the controlling device for the rod $h$ so that the rod $h$ no longer immobilizes the disk $f$ by hooking or engaging the beak $f^2$ by its tooth $h^2$; the disk $f$ and the socket $e$ $e^1$ driven by the plate $d$, recommence to share in the movement of rotation of the free-wheel pinion, in the direction of the arrow $x$, the teeth $f^1$ of the disk depressing the beak $h^2$ of the rod $h$, as above stated.

If the cyclist forgets to release the control device, that is to say to lower the rod $h$, then at the moment the plate $d$ reaches the end of its travel toward the right (Fig. 1), the disk $f$ driven by the plate $d$ which at this moment is fast thereto, might bend the rod $h$ or stop the movement of the pedal gear; in order to avoid this inconvenience the disk $f$ ceases automatically at this moment to be immobilized, and this is effected in the following manner; the plate $d$ is provided with an eccentric part $d^2$ so arranged that when the plate $d$ is at the bottom of its travel toward the right, this eccentric part, projection or cam $d^2$, meets a part $h^3$ of the rod, cranked at right angles and depresses the beak $h^2$ of the rod so that the latter no longer prevents the rotation of the disk $f$ and of the socket $e$ $e^1$.

The invention thus permits the cyclist, without dismounting from his machine, to change, as desired, from free-wheel drive to fixed-wheel drive, by simple back-pedaling, and inversely from fixed-wheel drive to free-wheel drive by continuing to pedal forward while exercising a slight pressure upon a control placed within reach of his hand.

The arrangement serving to immobilize the disk $f$ is shown only by way of example and can be replaced by any other suitable control.

Having now particularly described and ascertained the nature of my said invention and in what manner the same is to be performed, I declare that what I claim is:—

1. An arrangement applicable to bicycles and permitting to be changed at will, without descending from the machine, by pedaling in one direction or the other, a free-wheel bicycle pinion into a fixed wheel pinion, and inversely this arrangement comprising a male cone fast to the fixed portion of the free-wheel pinion, a female cone fast to the loose portion of this free-wheel pinion, a threaded socket, normally loose, a plate, participating in the movement of rotation of the loose portion of the free wheel pinion, means for screwing and unscrewing said plate upon said threaded socket in order to bring the male cone to or separate it from the female cone progressively—so as to clutch or declutch these two cones, and means for momentarily immobilizing said threaded socket in order to permit the screwing of said plate in one direction or in the other, according to whether the cyclist pedals or back-pedals.

2. An arrangement applicable to bicycles and permitting to be changed at will, without descending from the machine, by pedaling in one direction or the other, a free-wheel bicycle pinion into a fixed wheel pinion and inversely, this arrangement comprising a male cone fast to the fixed portion of the free-wheel pinion, a female cone fast to the loose portion of this free-wheel pinion, a threaded socket, normally loose, a plate, participating in the movement of rotation of the loose portion of the free wheel pinion, means for screwing and unscrewing said plate upon said threaded socket in order to bring the male cone to or separate it from the female cone progressively—so as to clutch or declutch these two cones, a disk having beaks or teeth thereon fast with this socket, a rod which engages with one of the beaks or teeth of said disk, when the cyclist back-pedals,—in such a way as to pass from free-wheel drive to fixed-wheel drive,—while in order to obtain the opposite change, the cyclist pedals forward while acting on a control placed within reach of his hand, said control bringing then the said rod in engagement with another tooth on the disk, nearer than the other to the axis of rotation of said disk.

3. An arrangement applicable to bicycles and permitting to be changed at will, without descending from the machine, by pedaling in one direction or the other, a free-wheel bicycle pinion into a fixed wheel pinion and inversely this arrangement comprising a male cone fast to the fixed portion of the free-wheel pinion, a female cone fast to the loose portion of this free-wheel pinion, a threaded socket, normally loose, a plate participating in the movement of rotation of the loose portion of the free-wheel pinion, means for screwing and unscrewing said plate upon said threaded socket in order to bring the male cone to or separate it from the female cone progressively—so as to clutch or declutch these two cones, a disk having beaks or teeth thereon fast with this socket, a rod which engages with one of the beaks or teeth of said disk, when the cyclist back-pedals,—in such a way as to pass from free-wheel drive to fixed-wheel drive,—while in order to obtain the opposite change, the cyclist pedals forward while acting on a control placed within reach of his hand, said control bringing then the said rod in engagement with another tooth on the disk, nearer than the others to the axis of rotation of said disk, and means for automatically disengaging said disk at the moment the pinion returns to free-wheel drive, in case the cyclist forgets to release the control effecting the immobilization of the screw-threaded socket which is fast with the disk.

In testimony whereof I have signed my name to this specification.

GASTON HENRY.

Witnesses:
CHARLES IVRY,
H. DEFÈVRIMONT.

Copies of this patent may be obtained for five cents each, by addressing the "Commissioner of Patents, Washington, D. C."